H. A. KINNEY.
ELECTRIC ACCUMULATOR.
APPLICATION FILED SEPT. 29, 1913.
1,123,756.
Patented Jan. 5, 1915.
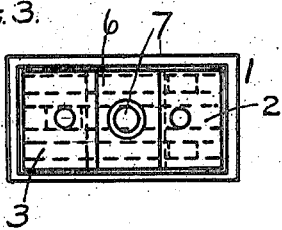
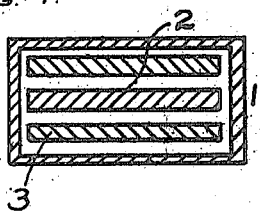
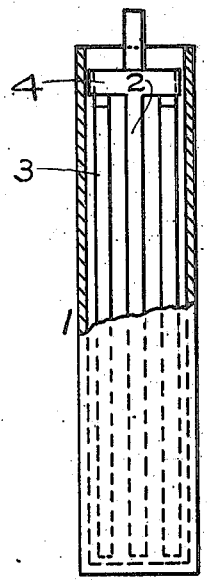
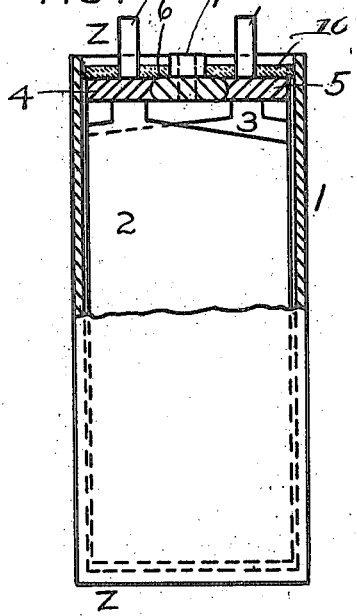
WITNESSES:
INVENTOR.
Harry A. Kinney
BY
ATTORNEY.

UNITED STATES PATENT OFFICE.

HARRY A. KINNEY, OF LANSING, MICHIGAN.

ELECTRIC ACCUMULATOR.

1,123,756.  Specification of Letters Patent.  Patented Jan. 5, 1915.

Application filed September 29, 1913. Serial No. 792,507.

*To all whom it may concern:*

Be it known that I, HARRY A. KINNEY, a citizen of the United States, residing at Lansing, in the county of Ingham and State of Michigan, have invented new and useful Improvements in Electric Accumulators, of which the following is a specification.

My invention relates to electric accumulators, and its purpose is to make a device in which it shall be possible to clean or replace the electrolyte without disconnecting the connecting straps from the plates or deranging in any way the grouping.

More specifically, my device consists of such construction of the connecting straps for the positive and negative plates as will make each of these straps a portion of the cover for the cell, and completing this cover by means of a plate of insulating material to be inserted between the connecting straps and kept in place by suitable grooves, projections or rabbets, thus serving at the same time to complete the cover to the cell, holding the plates firmly in their position and making, in combination with the connecting straps, a closely fitting cover for the cell, which shall prevent any of the sealing cement which may be afterward poured into the top from going into the electrolyte.

I attain these purposes by the means shown in the accompanying drawings in which—

Figure 1 is a side, and Fig. 2 an elevation of an electric accumulator cell, a portion of the cell being broken away to show the construction of my device and its arrangement with reference to the other parts of the cell. Fig. 3 is a plan view of the top, and Fig. 4 a cross section of a cell.

In the drawings, 1 is the outer cell, which is of any ordinary construction; 2 and 3 are respectively the positive and negative plates which are connected, by burning or in any preferred manner, to the connecting straps 4 and 5. The extremities and outer edges of the connecting straps 4 and 5 are formed to fit the outer wall of the cell so that when in place and pressed against the wall of the cell they will form part of the cover; 6 is a plate or block of insulating material provided with a suitable vent, 7, in the usual manner. The plate 6 is of a length equal to the width of the cell and has its extremities adapted to closely contact with the cell walls, and its opposite edges are provided with grooves, projections or rabbets of any desired form or construction, adapted to engage with reversed projections, grooves or rabbets, on the inner edges of the connecting straps, thus serving to firmly retain the plate in position between the connecting straps 4 and 5, and forming with them close joints, preventing any of the sealing cement 10, if any shall be employed, from flowing through into the electrolyte. The plate 6 is constructed of such width that when in position it presses the connecting straps firmly against the inner walls of the cell, thus making tight joints at that point, and also serving to hold the plates securely in position.

The connecting straps 4 and 5 are provided in the usual manner with any well known form of connections 8 and 9 but these form no part of my present invention.

The walls of the cell stand slightly above the connecting straps and the plate 6 forming a tray into which vaseline, asphalt or any other suitable cement may be poured, hermetically sealing the cell in the usual manner.

When it is desired to clean the cell, it is only necessary to remove the sealing cement and the plate 6, when the electrolyte can be poured out, and afterward the plates removed and washed without disconnecting them from the connecting straps, it being only necessary to uncouple the cells from each other.

I claim as my invention and desire to secure by Letters Patent.

1. The combination in an electric accumulator with positive and negative plates, of a connecting strap, joined to and connecting said positive plates; a second connecting strap joined to and connecting said negative plates, and a cover composed of insulating material between said connecting straps.

2. The combination in an electric accumulator with positive and negative plates, of a connecting strap, joined to and connecting said positive plates; a second connecting strap joined to and connecting said negative plates; a cover composed of insulating material between said connecting straps, and means of retaining said cover in position between said connecting straps.

3. The combination in an electric accumulator with positive and negative plates, of a connecting strap, joined to and connecting said positive plates; a second connecting strap joined to and connecting said negative plates; a cover composed of insulating material between said connecting straps, and means of retaining said cover in position between said connecting straps, said means comprising mutually engaging grooves and projections, formed on the adjacent edges of said cover and straps.

4. The combination in an electric accumulator with positive and negative plates and a containing cell, of a connecting strap, joined to and connecting said positive plates; a second connecting strap joined to and connecting said negative plates, said connecting straps being separated from each other and having their nonadjacent edges adapted to closely contact with the walls of said containing cell, and a cover composed of insulating material between said connecting straps.

5. The combination in an electric accumulator with positive and negative plates and a containing cell, of a connecting strap joined to and connecting said positive plates; a second connecting strap joined to and connecting said negative plates, said connecting straps being separated from each other and having their nonadjacent edges adapted to closely contact with the walls of said containing cell; a cover composed of insulating material between said connecting straps, and means of retaining said cover in position between said connecting straps.

6. The combination in an electric accumulator with positive and negative plates and a containing cell, of a connecting strap, joined to and connecting said positive plates; a second connecting strap joined to and connecting said negative plates, said connecting straps being separated from each other and having their nonadjacent edges adapted to closely contact with the walls of said containing cell; a cover composed of insulating material between said connecting straps, and means of retaining said cover in position between said connecting straps, said means comprising mutually engaging grooves and projections, formed on the adjacent edges of said cover and said connecting straps, and adapted to retain said cover in position between said straps.

7. The combination in an electric accumulator with positive and negative plates and a containing cell, of a connecting strap, joined to and connecting said positive plates, and adapted to form a portion of the cover of said cell; a second connecting strap joined to and connecting said negative plates, and adapted to form a second portion of the cover of said cell, and a plate of insulating material removably inserted between said connecting strap, and adapted to form the remaining portion of the cover of said cell.

8. The combination in an electric accumulator with positive and negative plates and a containing cell, of a connecting strap, joined to and connecting said positive plates, and adapted to form a portion of the cover of said cell; a second connecting strap joined to and connecting said negative plates, and adapted to form a second portion of the cover of said cell, and a plate of insulating material removably inserted between said connecting straps, and adapted to form the remaining portion of the cover of said cell, and means for hermetically sealing said cell.

HARRY A. KINNEY.

Witnesses:
GRACE A. MacDONALD,
MAY LA ROCK.